Oct. 11, 1960 R. M. ASHBY 2,956,275
DUOMODE MONOPULSE RADAR SYSTEM
Filed March 17, 1951 6 Sheets-Sheet 1

INVENTOR.
ROBERT M. ASHBY
BY
William R. Lane
ATTORNEY

FIG. 3

INVENTOR.
ROBERT M. ASHBY
BY
ATTORNEY

INVENTOR.
ROBERT M. ASHBY
BY
William R. Lane
ATTORNEY

*INVENTOR.*
ROBERT M. ASHBY

United States Patent Office 2,956,275
Patented Oct. 11, 1960

2,956,275

DUOMODE MONOPULSE RADAR SYSTEM

Robert M. Ashby, Pasadena, Calif., assignor to North American Aviation, Inc.

Filed Mar. 17, 1951, Ser. No. 216,145

9 Claims. (Cl. 343—16)

This invention pertains to radar systems, and particularly to an improved radar system incorporating simultaneous lobing which is adapted for use in an aircraft.

In the past it has been proposed to improve the accuracy of tracking data obtainable from a radar, over what had previously been obtainable from a sequential lobing or conical scan system, by use of a set of simultaneous antenna lobes in order to obtain complete tracking information from the target echo each time a pulse is transmitted and received. If a plurality of microwave energy lobes is created simultaneously, and if, as a consequence, complete information as to the target's bearing and distance is obtained at the pulse repetition frequency, a more satisfactory track of rapidly moving targets can be obtained. Simultaneous lobing schemes thus far proposed, however, have involved the use of a multiplicity of electromagnetic radiators fed from a common source of microwave energy by means of complicated microwave bridges such as the "rat race" or other equally complex microwave plumbing devices. In some schemes the electrical path lengths from the source of microwave energy to each of the radiating elements is different. It is necessary in these cases, therefore, to introduce a phase delay in some of the wave guides to compensate for the relative phase shift resulting in the guides. These phase delay devices are, in general, narrow band devices, i.e., the range of frequencies over which the phase delay has the desired magnitude (without tuning adjustments) is extremely narrow. In addition, most phase shifting devices reduce the power handling capacity of the system. As a result it is necessary, in general, to operate at reduced power over a narrow band of frequencies, reducing the maximum range of the radar and making the radar more susceptible to enemy jamming. In other schemes a fairly simple radio frequency bridge system is employed, but a wide spacing between radiators is required to obtain sufficient tracking sensitivity. This type system has the inherent disadvantage of a high side-lobe level in the antenna radiation patterns and is thus susceptible to jamming.

It is an object of this invention to provide a sumultaneous lobing radar system with simplified radio frequency plumbing adapted for use where space and weight limitations are severe.

It is another object of this invention to provide a radar system which eliminates the need for phase delay devices in the wave guides thereof.

It is another object of this invention to provide a radar system incorporating simultaneous lobing and having only two microwave radiators.

It is another object of this invention to provide a simultaneous lobing radar system which has a relatively broad frequency range.

It is another object of this invention to provide a simultaneous lobing radar system having a minimum spacing between radiators.

It is another object of this invention to provide a simultaneous lobing or monopulse radar system with minimized side-lobe levels.

Other objects of invention will become apparent from the following description taken in connection with the accompanying drawings, in which.

Figure 1:
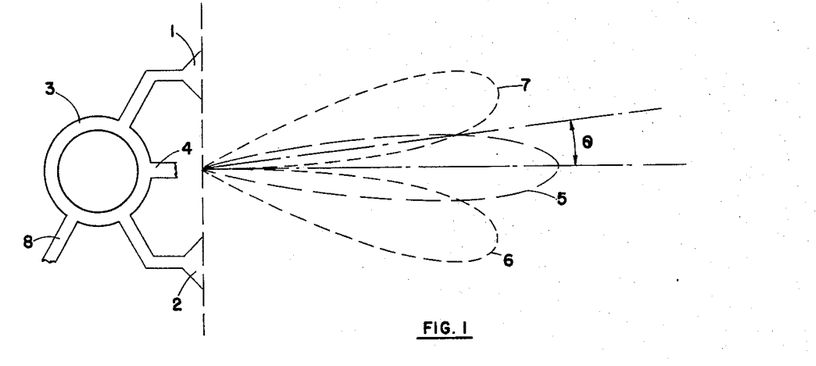
Fig. 1 is a schematic drawing of a simple two-dimensional monopulse or simultaneous lobing radar system.

Referring to Fig. 1, a simple monopulse or simultaneous lobing radar system for locating a target in a single plane is shown. Radiators 1 and 2 are fed with equal amounts of power by means of a rat race 3, such as is described in detail in the book "Microwave Transmission Design Data," by Theodore Moreno, at page 181 et seq. The radiation pattern of the two radiators in the plane of the paper is of the form $$F(\theta) = 2E(\theta) \cos\left(\frac{d}{2T} \sin \theta + \frac{\phi}{2}\right)$$

where $E(\theta)$ is the radiation pattern for a single radiator, $\phi$ is the relative phase of the two radiators, $d$ is the distance between the two radiators, and $\theta$ is measured as shown in Fig. 1. If the two radiators are fed with electromagnetic waves in-phase through arm 4 of rat race 3, the resultant radiation pattern for the two radiators may be represented by curve 5 in Fig. 1. The range of a target may be measured therefore by measuring the time elapsing between the transmission of a pulse of electromagnetic energy by the radiators, and the reception of an echo from the target in accordance with well-known radar theory.

If now the two radiators are fed with electromagnetic waves out-of-phase, the resultant radiation pattern for the two radiators may be represented by curves 6 and 7 of Fig. 1, since near the axis of symmetry, energy from the two radiators tends to cancel out if out-of-phase; whereas outboard therefrom such cancellation does not occur. In fact, reinforcement occurs at the maxima of the two lobes. If conventional radar receivers are connected to receive signals from arms 4 and 8 the output of these receivers may be used to obtain the location of a target in the plane of Fig. 1. Since arm 4 of rat race 3 is equidistant from radiators 1 and 2, in-phase echoes received by the radiators will be transmitted through arm 4 to its receiver. Likewise, if arm 8 is an odd multiple of half-wave lengths farther from radiator 1 than from radiator 2, out-of-phase echoes received by the radiators will tend to add, as seen from arm 8 by its receiver; while in-phase echoes as seen from arm 8 will cancel out. Therefore, if a target is on-axis, i.e., if it is directly in front of the two radiators and on a perpendicular bisector erected to a line joining the two radiators, no energy due to return echo will be received through arm 8, but energy will be received through arm 4. That it is received through arm 4 indicates the presence of the target, and the fact that it is not received through arm 8 indicates the target is exactly on-axis and that, therefore, the radiators are pointed toward the target. On the other hand, if the target is slightly off-axis, both in-phase and out-of-phase echoes will be received by radiators 1 and 2, and the out-of-phase component thereof will be transmitted through arm 8 of rat race 3 to its receiver. The magnitude of the out-of-phase echo indicates the extent to which the target is off-axis (for small errors), and corrective action directed toward reorienting radiators 1 and 2 upon a target may be initiated. In order to provide three dimensional information about a target with the system just described it would be necessary to provide at least four radiators in order that the amount by which a target is off-axis, both in elevation and azimuth, may be indicated. Such a system would obviously involve the use of multiple rat races or magic tees, the effect of which is to create a bulky radar which would be frequency-sensitive or narrow-band.

This invention contemplates the use of a system in principle similar to that indicated in Fig. 1 for determining the coordinates of a target in one plane, and the use of a novel duomode bridge for locating a target in a plane normal to the plane of Fig. 1. This invention takes advantage of the fundamental property of a rectangular wave guide which allows it to support the propagation of electromagnetic energy in more than one mode.

In order to understand and appreciate fully the unique features of this invention it is apropriate to review briefly as a point of departure in this discussion some of the basic principles of microwave transmission upon which the invention depends. In this discussion a wave guide is taken to mean a parallelepipedal dielectric medium with a closed conducting boundary. A double rectangular wave guide is defined as "two wave guides having one conducting boundary in common." If a generator of very high frequency electromagnetic waves is connected to one end of a wave guide, an example of such a generator being a magnetron or cavity resonator, the wave guide may transmit the electromagnetic waves in a wide variety of modes, depending upon the relation between the geometry of the guide and the nature of the generated waves. This invention concerns itself primarily with a class of modes of transmission which has become known as "transverse electric." It is understood to mean that the magnetic field has a component parallel to the wave guide axis, but the electrical field therein is everywhere transverse to the axis. Transverse electric waves are further identified by indicating by subscripts the number of half-period variations in transverse field intensity along the short and long dimension of the wave guide cross-section, respectively. For instance, the dominant mode in rectangular wave guide is the $TE_{01}$ mode, indicating that the wave is of the transverse electric type, that there is no variation in the transverse field along the short dimension, and that there is a single half-wave variation of transverse field along the long dimension thereof. Similarly, $TE_{02}$ mode indicates that there is no variation in the transverse field along the short dimension of the wave guide cross-section, and two half-wave variations of transverse field along the long dimension thereof. Considered from another point of view, one might say that in cutting the wave guide at any particular plane normal to its axis one would find that equal and opposite electrical charges exist in the opposite sides of the wave guide along which variations of transverse field exist. These opposing charges, of course, are corrollary to the existence of the field.

It has long been considered that to propagate electromagnetic waves in more than one mode in a wave guide is inefficient for the reason that normally only one of the modes can be successfully coupled to any load, and energy in the other mode is, therefore, largely wasted. However, in accordance with this invention it is possible to propagate two modes successfully, simultaneously in the same wave guide; and by an improved bridge system, to couple out both modes without undue loss.

Figure 5:
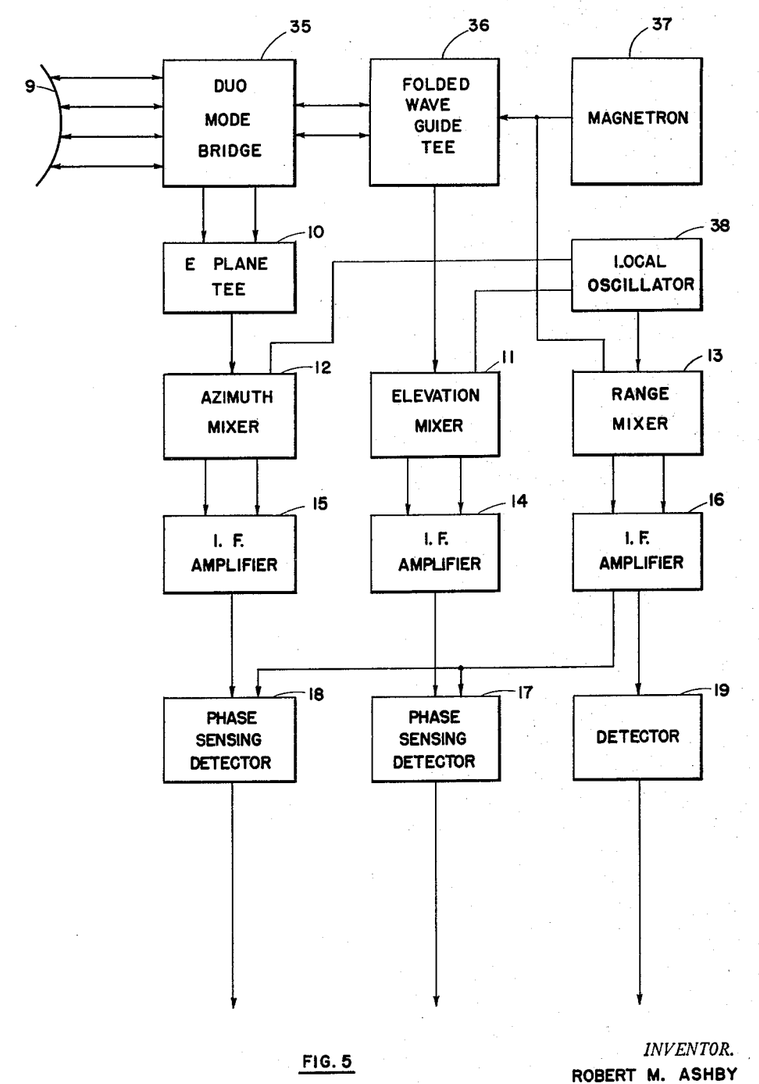
Fig. 5 is a block diagram of the invention.

Referring now to Fig. 5, a magnetron 37 generates pulses of microwave energy which in turn are fed through folded wave guide T 36 and duomode bridge 35 to antenna reflector 9. Energy reflected from the target is picked up by antenna reflector 9, fed back through bridges 35 and 36, and thence to E-plane T 10, elevation mixer 11, azimuth mixer 12, and range mixer 13. Signals from these mixers are fed through IF amplifiers 14, 15, and 16 to detectors 17, 18, and 19 from which signals indicative of elevation, azimuth, and range to the target are obtained.

Figure 2:
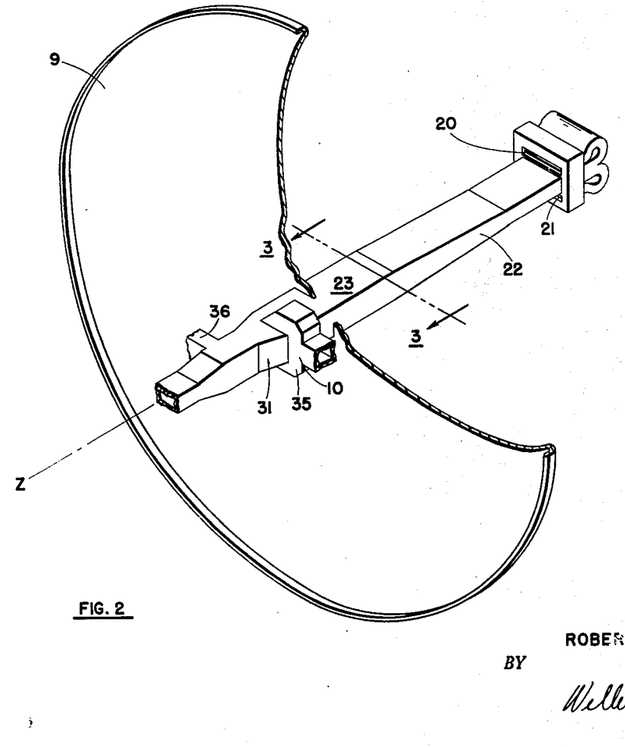
Fig. 2 is a perspective view of a preferred embodiment of the invention.

Referring now to Fig. 2, there is shown a parabolic reflector 9 for directing electromagnetic energy sharply toward a target and for focusing energy returned from such a target so that it may re-enter the radio frequency system from which it originally came. In Fig. 2 the reflected energy is returned to slots 20 and 21 in antenna feed 22, more fully described and indicated in patent application Serial No. 216,133, filed March 17, 1951, in the names of Stanley M. Kerber, Grant M. Randall, and Donald F. Zemke, now abandoned. The purpose of the antenna feed is to illuminate the surface of reflector 9 with microwave energy and to perform the proper impedance match between wave guide 23 and free space. For purposes of simplicity of explanation this feed and the antenna are omitted in Figs. 3 and 4, it being understood that their omission is only for the purpose of facilitating a clear understanding of the functioning of the parts of the system shown in Figs. 3 and 4.

Figure 3:
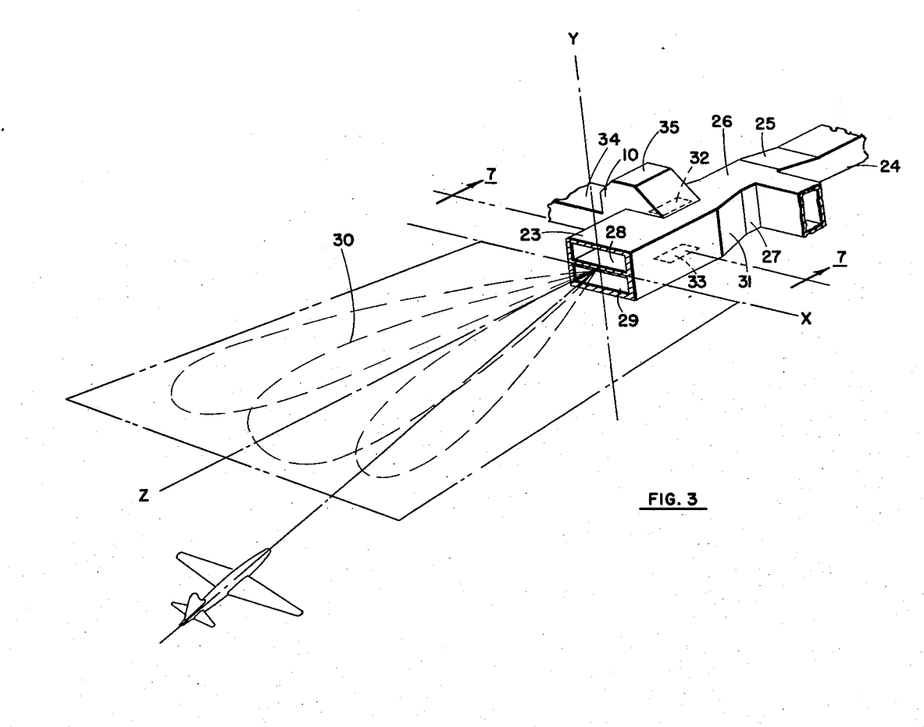
Fig. 3 is a perspective view of a part of the microwave plumbing of this invention showing a target displaced from the principal axis of the antenna of this invention in azimuth.
Figure 4:
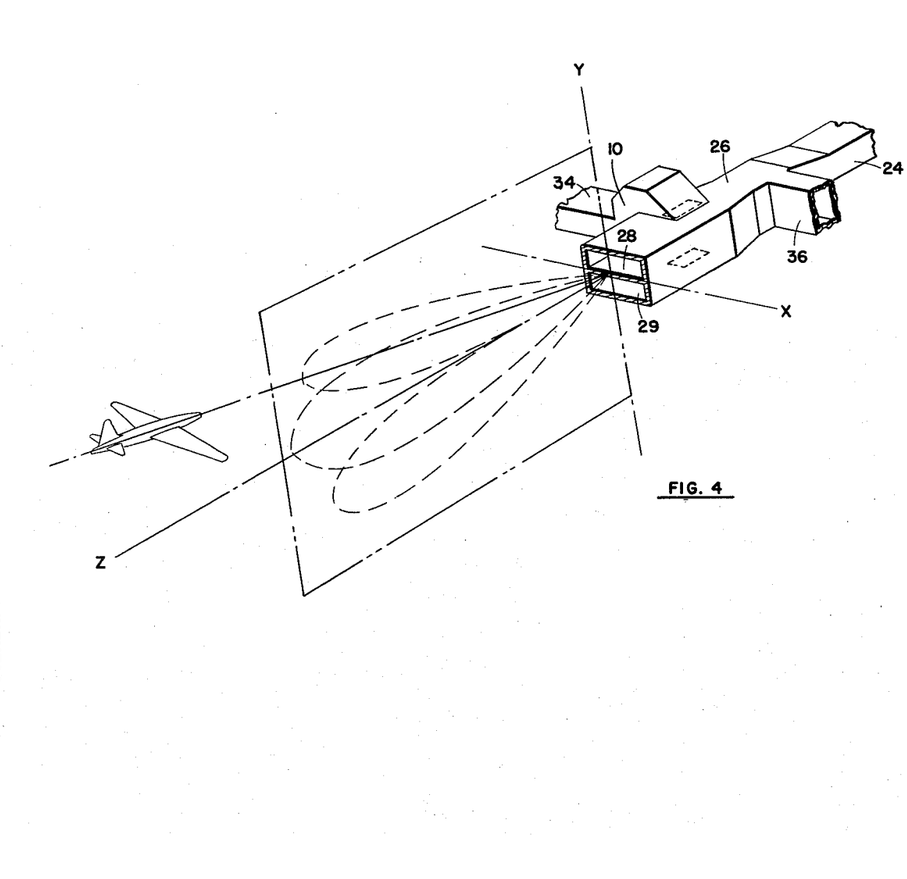
Fig. 4 is a perspective view of the device shown in Fig. 3 with a targe displaced in elevation.

Referring now to Figs. 3 and 4, the end of wave guide 23 is shown as if cut at plane 3—3 in Fig. 2, radiating a pattern of energy such as could only be obtained by the use of a reflector such as reflector 9, and a feed similar to feed 22. In Fig. 3, energy in the $TE_{01}$ mode is propagated from magnetron 37 through rectangular wave guide section 24, thence through tapered section 25 to rectangular section 26. At 27 the guide is again tapered in the broad direction, and a knife-edge septum is introduced which splits the energy into upper and lower guides 28 and 29. Thus, guides 28 and 29 propagate the $TE_{01}$ mode with equal intensity and in phase. By means of the feed and antenna reflector system shown in Fig. 2 but not shown, for convenience, in Figs. 3 and 4, a lobe 30 is propagated into free space. If the target is exactly on the Z-axis, each wave of the reflected energy from the target arrives back at the end of wave guide sections 28 and 29 at exactly the same instant. The reflected energy, still in $TE_{01}$ mode, is carried back through the microwave transmission system in the same manner as it was sent out, and the time interval between the transmission of a pulse and the reception of its echo indicates the range of the target. However, if the target is off-axis in azimuth, as illustrated in Fig. 3, while the time for the reflected wave to return is still the same and the range indication is therefore the same, the reflected wave is incident upon one side or the other of the two wave guides before reaching the other side. The incident wave therefore excites a complex electromagnetic field in each of wave guides 28 and 29, which wave may be resolved into components which correspond to two different modes of propagation in the wave guide. One component, of course, is the $TE_{01}$ mode. In addition, wave guides 28 and 29 support a second mode—the $TE_{02}$ mode. The $TE_{01}$ mode travels back through the wave guide to section 24 in the same manner as if the target were on-axis. However, the $TE_{02}$ mode cannot be transmitted through tapered section 31 because the transverse dimension of the guide beyond that point will not support this mode. The $TE_{02}$ mode, it will be recalled, has two half-wave variations of transverse field along the wide dimension, or X-axis, in Fig. 3. However, the $TE_{02}$ mode is transmitted through slots 32 and 33 in the top and bottom, respectively, of wave guides 28 and 29, because, considering again the condition of the charges on the surfaces of wave guides 28 and 29, an electric field is set up with a direction parallel to the X-axis in Fig. 3 on the upper and lower surfaces, respectively, of wave guides 28 and 29. The $TE_{02}$ mode transmitted by wave guide sections 28 and 29, therefore, is successfully separated out and transmitted through slots 32 and 33 to the side arm 34 of duomode bridge 35. It will be observed that the energy which exists in the $TE_{02}$ mode in wave guide sections 28 and 29 is transmitted as $TE_{01}$ mode in side arm 34. By a system of phase comparison, more fully described in connection with Fig. 5, the direction in which the target is off-axis in azimuth can be derived from the information implicit in the energy carried back by wave guide 24.

Referring now to Fig. 4, the situation is presented in which the target is off-axis in elevation. In this case the reflected energy arrives in wave guide sections 28 and 29 slightly out-of-phase, the amount of phase difference depending upon the extent to which the target is off-axis in elevation. Actually the echo excites in wave guide sections 28 and 29 electromagnetic fields which may each be broken into mutually in-phase and mutually out-of-phase $TE_{01}$ components. In other words, the fields in any cross-section of the wave guides can be expressed as the sum of two in-phase $TE_{01}$ mode waves and two out-of-phase $TE_{01}$ mode waves. The out-of-phase components are separated and are caused to flow through folded wave guide T 36, more fully described in patent application Serial No. 216,143 filed March 17, 1951, now Patent No. 2,764,740, in the name of Amasa Pratt, while the in-phase components proceed through wave guide section 24. Again, in a manner to be more fully described in connection with Fig. 5, the phase difference between the energy in wave guide T 36 and in wave guide section 24 is compared to give an indication of the direction in which the target is off-axis in elevation. The amplitude of the output of wave guide T 36 is proportional to the displacement of the target off-axis in elevation for small error angles, and the amplitude of the output from error arm 34 is proportional to the error off-axis in azimuth.

Figure 6:
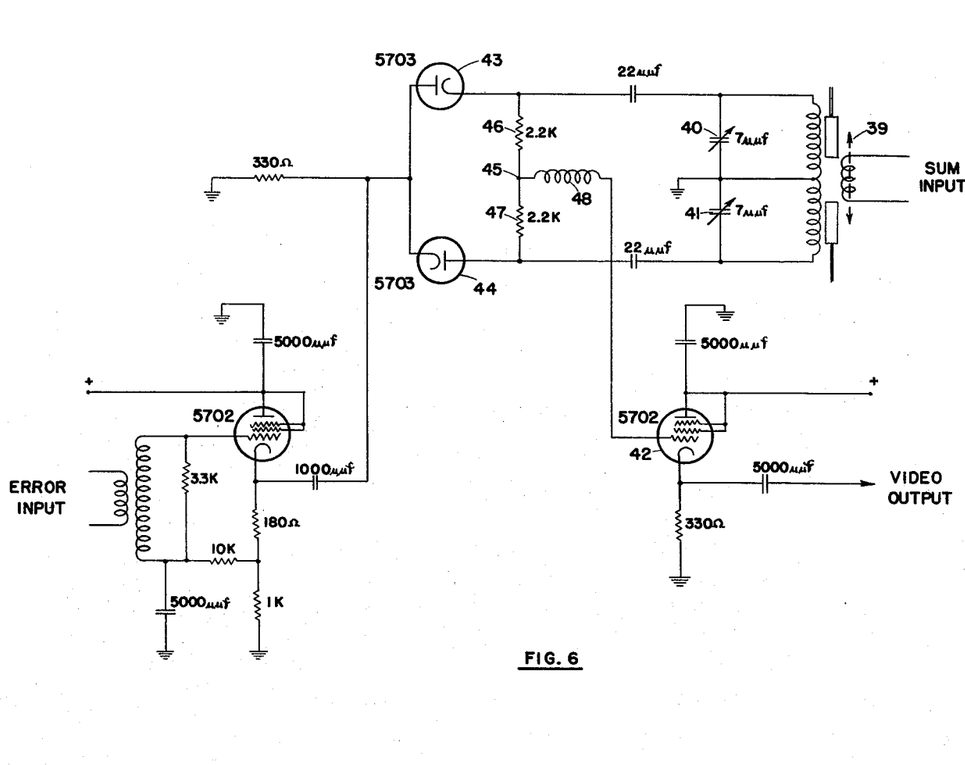
Fig. 6 is a circuit diagram of the phase detector of this invention.

Referring now to Fig. 5, the output of folded wave guide T 36 is fed through elevation mixer 11. Elevation mixer 11 also receives the output of local oscillator 38 which is a conventional klystron type oscillator tuned to a frequency near the frequency of the microwave energy reflected from the target, say 30 mc. above or below the magnetron frequency. Mixer 11 therefore produces an output frequency which is the beat frequency or difference frequency between the magnetron frequency and the local oscillator frequency in accordance with the superheterodyne principle. This beat frequency may be chosen at an intermediate value of about 30 mc., which frequency may be conveniently amplified in IF amplifier 14. From IF amplifier 14 the signal is fed to phase sensing detector 17 which compares the phase of the output of the T 36 with the output derived from wave guide section 24 in Fig. 3. A detailed circuit diagram of phase sensing detector 17 is shown in Fig. 6. There are two intermediate frequency inputs to phase sensing detector 17, one from elevation mixer 11 through IF amplifier 14, and the other from range mixer 13 through IF amplifier 16. The former input is termed the "error" input because it represents the extent to which the target is displaced in elevation from the "line of sight" of the radar antenna. The latter input is termed the "sum" input, since it is derived from the in-phase components of the $TE_{01}$ mode reflection from the target. The sum input is fed through tuned input transformer 39, the two secondary halves of which are individually tuned by means of condensers 40 and 41 to the correct resonant frequency (30 mc. for the circuit shown). As previously revealed, if the error input is in phase with the sum input, the target is displaced in elevation in one direction, and if the error input is out of phase with the sum input the target is displaced in elevation in the opposite direction. The function of the phase detector is to generate as the video output a voltage of one polariy if the error input is in phase with the sum input, and a voltage of the opposite polarity if the error input is 180° out of phase with the sum input. Since this video output is derived from cathode follower 42, we may look at the input to the grid of cathode follower 42 as the output of the circuit in explaining the functioning thereof. From Fig. 6 it can be seen that if there is no error input, the voltage on the grid of triode 42 will be zero, since the cathode of diode 43 and the plate of diode 44 contribute equally and oppositely to the voltage at point 45 where resistances 46 and 47 and radio frequency choke 48 are joined. However, if the error input is in phase with the sum input, current through one of the diodes will be increased, while the current through the other diode will be decreased. The opposite situation will obtain when the error input is 180° out of phase with the sum input, so that if the error input is in phase with the sum input, a voltage of one polarity appears as the video output, while the opposite voltage appears if the error input is 180° out of phase with the sum input. In this way the sense of the error, i.e., the direction in which the target is off-axis in elevation with respect to the antenna, is given by the polarity of the output voltage.

The sense of the error in azimuth is detected by phase sensing detector 18, and the direction in which the target is off-axis in azimuth is revealed by the polarity of the output voltage of phase sensing detector 18 in a similar manner.

Figure 7:
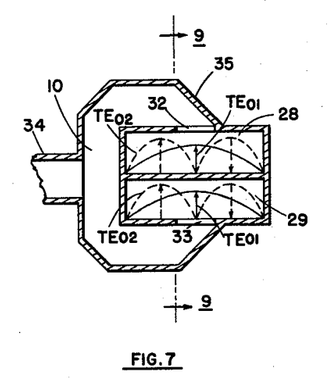
Figs. 7 and 8 are sectional views of the invention taken at 7—7 in Fig. 3.
Figure 8:
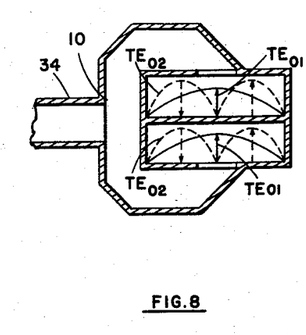

Referring now to Fig. 7, which is a sectional view taken where duomode bridge 35 is attached to wave guide section 28, the relative transverse electric field strength is plotted as a function of wave guide transverse dimension as it would appear when the target is off-axis in azimuth. When the target is off-axis in azimuth the electromagnetic waves are propagated within each section of the guide in two modes. The fundamental or dominant mode is the $TE_{01}$ mode and is so designated in Fig. 7. The secondary mode is the $TE_{02}$ mode and is plotted in dotted lines in Fig. 7. It will be observed that two half-wave variations in transverse field exist along the long cross-sectional dimension of the guide, and that the fields are oppositely directed and reach maxima at the two quarter points of the long cross-sectional dimension of the guide. The function of the duomode bridge is to couple out of the main guide all electromagnetic waves in the $TE_{02}$ mode. This is accomplished by exciting in the side arms of the bridge electromagnetic waves of the $TE_{01}$ mode by means of slots 32 and 33. When the target is off-axis in azimuth to the left, the condition of the fields may be assumed to be as represented in Fig. 7. In this case the resultant $TE_{01}$ mode transmission through the side arm of the bridge may be assumed to be "in-phase" with the $TE_{01}$ mode electromagnetic waves being propagated through the main guide. Whether the $TE_{01}$ mode electromagnetic waves transmitted through the side arm are, indeed, in phase with the $TE_{01}$ electromagnetic waves transmitted through the main guide will, of course, depend upon the relative path lengths from the feed to the point of phase comparison, i.e., the phase sensing detector, but it may be assumed in general that the relative path lengths may be varied somewhat in order to assure that this result will be obtained. If this assumption is correct, and then if the target is displaced off-axis in azimuth by a similar amount to the right, the condition of the fields within the guide may be represented as shown in Fig. 8. It will be observed that the $TE_{02}$ fields have merely been reversed in sense in Fig. 8 from what they were in Fig. 7. Hence, for the same path lengths and other relevant parameters the $TE_{01}$ mode electromagnetic waves propagated in the side arm of the guide will be 180° out-of-phase with the $TE_{01}$ electromagnetic waves propagated through the main guide. Therefore, the same phase detector circuit may be employed in phase sensing detector 18 as in phase sensing detector 17, and the sign of the output voltage of phase sensing detector 18 indicates the direction in which the target is off-axis in azimuth. Phase sensing detectors 17 and 18 therefore yield signals proportional to the amounts by which a target whose echo has been detected is off-axis in elevation and azimuth, respectively, for small error angles. The directions in which the target is off-axis in elevation and azimuth are indicated by the signs of the outputs of phase sensing detectors 17 and 18, respectively. If the target is not off-axis in azimuth or elevation, phase sensing detectors 17 and 18 yield no output. If it is off-axis in azimuth or in elevation, the outputs of phase sensing detectors 17 and 18 are used to train antenna reflector 9 so that the reflector points directly to the target. The manner in which these training operations may be accomplished is more fully described in patent application Serial No. 152,026, now Patent No. 2,654,031, entitled "Antenna Mount" filed March 25, 1950 in the name of William D. Mullins et al. The apparatus described in the application just referred to cooperates with this invention to form a servo loop, i.e., so long as the outputs of the phase sensing detectors indicate that the target is off-axis, the antenna reflector continues to be actuated in the sense required to reduce the output of the phase sensing detectors until a null point is reached. Thereafter, antenna reflector 9 remains virtually fixed upon the target and tracks the target automatically.

The signal from detector 19 yields range information in accordance with conventional radar theory. The function of detector 19 is to generate a signal indicative of the time between the transmission of a pulse by magnetron 37 and the reception of an echo from the target. This time is directly proportional to the range of the target; hence the output of detector 19 is an indication of range. Any one of a number of detector circuits for such time measurement, all well known to the radar art, may be employed for this purpose. The Radiation Laboratory Series, a 1947 publication and a standard work in the art, is replete with such detector circuits. For example, in vol. 1, entitled "Radar Systems Engineering," the circuits illustrated on pages 464, 465 and 466 are fully capable of performing the functions required of the applicant's detector; in vol. 23, entitled "Microwave Receivers," chapter 15 deals with "A Receiver For an Automatic-Tracking Radar." On pages 387, 388, 389 and 392 of this volume are found circuit diagrams which are also capable of performing the desired functions.

Figure 9:
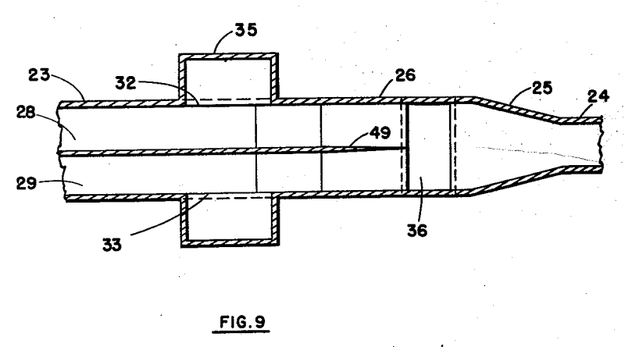
Fig. 9 is a sectional view taken at 9—9 in Fig. 7.

The manner in which the in-phase $TE_{01}$ mode electromagnetic waves reflected from the target are separated from $TE_{01}$ mode waves mutually out-of-phase is also illustrated by reference to Fig. 9 which is a longitudinal sectional view through the wave guide. As disclosed above, the reflected wave undergoes mode separation first, i.e., the $TE_{02}$ mode waves are coupled out of the guide by means of slots 32 and 33 and excite in the side arms of duomode bridge 35 electromagnetic waves in the $TE_{01}$ mode. Then the reflected wave proceeds back through the guide to folded wave guide T 36 where electromagnetic waves which are mutually out-of-phase are coupled out by T 36. Where septum 49 terminates and the double guide becomes a single guide, propagation of the $TE_{01}$ mode in mutually out-of-phase components ends, and beyond this point only in-phase $TE_{01}$ waves are propagated through the single guide. These $TE_{01}$ mode waves are fed to detector 19 and used to determine range to the target. The out-of-phase $TE_{01}$ mode waves are propagated through T 36 to mixer 11.

Thus the apparatus yields signals at the radar pulse repetition rate which may be used to train the antenna reflector upon a target continuously. The actual angular orientation of the antenna reflector may then be determined as indicated in patent application Serial No. 152,026, previously referred to, by an appropriate system of position pickoffs.

Although the invention has been described and illustrated in detail, it is to be clearly understood that the same is by way of illustration and example only and is not to be taken by way of limitation, the spirit and scope of this invention being limited only by the terms of the appended claims.

I claim:

1. Wave guide radiator means whose outputs are indicative of the azimuth and elevation of a distant object comprising a rectangular cross-section wave guide having a thin septum parallel to its wide dimension and exactly bisecting said wave guide, said wave guide being capable of supporting the propagation of transverse electric waves in two modes in each part thereof; source means connected to said guide for feeding into said guide transverse electric waves having one half-wave field intensity variation across the wide dimension of the guide; a parabolic reflector operatively associated with the end of said guide for directing transverse electric wave energy toward an object; feed means connected to the end of said guide and directed toward the concave side of said reflector for illuminating said reflector with said transverse electric waves and for matching the impedance of said wave guide to free space; bridge means connected to said guide adjacent said feed means for coupling out of said wave guide all transverse electric waves having two half-wave intensity variations across the wide dimension of the guide; phase bridge means connected to said guides between said first bridge means and said source means for coupling out of said wave guides all out-of-phase components of transverse electric waves in said guides whereby if said reflector is directed generally at an object the waves reflected from the object enter each half of said guide slightly out-of-phase and excite in each guide transverse electric waves having two intensity variations across the wide dimension of the guides of intensity dependent upon the extent to which an object is displaced in elevation and azimuth respectively from the axis of symmetry of said reflector and the output of said first-named bridge means indicates the azimuth of said object while the output of said phase bridge indicates the elevation of said object.

2. In combination, a double rectangular cross-section wave guide capable of supporting transverse electric waves in two propagational modes in each part thereof, source means for feeding into said guide transverse electric waves having one half-wave intensity variation across the wide dimension of the guide, terminal means attached to the end of said guide for illuminating a reflector with said transverse electric waves and for matching the impedance of said wave guide to free space, mode bridge means attached to the side of said guide near said terminal means for coupling out of said wave guide all transverse electric waves having two half-wave intensity variations across the wide dimension of the guide, and phase bridge means attached to said guide between said mode bridge and said source means for coupling out of said wave guide any out-of-phase component of transverse electrical waves in said guides whereby if said reflector is directed generally at a target the output of said mode bridge indicates azimuth of said target and the output of said phase bridge indicates elevation of said target.

3. Microwave radiation apparatus comprising a microwave generator, a parabolic reflector for illuminating a distant target with microwave energy and for gathering reflected microwave energy from said target, a rectangular wave guide connected to receive microwave energy from said generator for propagating transverse electric microwave energy to the face of said reflector, said guide being dimensioned to propagate transverse electric waves having both one and two half-wave variations in electric field intensity across the broad cross-sectional dimension of said guide, a knife-edge septum in said guide splitting said rectangular wave guide into two guides parallel to the long cross-sectional dimension of said guide, receiver means connected to said guide adjacent said generator and responsive to out-of-phase microwaves received through said two guides, receiver means responsive to transverse electric waves having two half-wave variations in electric field intensity across the broad cross-sectional dimension of said guides received by said two guides, receiver means connected to said guide for measuring the time between transmission of a pulse of microwave energy and the reception of an echo from said target, and coupling means for delivering microwave energy from said guides to said receivers, whereby the magnitude of the outputs of said receivers is a measure of the angular displacements and range of said target from the axis of said guides respectively.

4. Electromagnetic wave propagation apparatus comprising a microwave generator, two identical rectangular wave guides associated together with the long dimensions thereof parallel, means connecting said generator and said guides for propagating transverse electric waves into said wave guides in phase and with equal intensity in the fundamental mode supported by said wave guides, receiver means connected to said guides for coupling out of said guides all transverse electric waves having two half-wave variations along the long cross-sectional dimension thereof, receiver means connected to said guides for coupling out of said wave guides separately all microwave energy which is opposed in time phase and all microwave energy which is in time phase, receiver means connected to said guides adapted to measure the time between the transmission of a pulse of microwave energy and the reception of its echo from a target, and coupling means connecting each of said guides to each of said receivers for delivering microwave energy from said guides to said receivers, whereby the amplitude of output of said first receiver is a function of the angular departure of a target from the axis of symmetry of said guides in the plane of the long dimension of said guides cross-section, the amplitude of output of said second receiver is a function of the angular departure of a target from the axis of symmetry of said guides in a plane normal to the long dimension of said guides cross-section, and the amplitude of output of the third said receiver is a function of the range of said target.

5. Microwave transmission apparatus comprising a single rectangular wave guide, a double rectangular wave guide of width sufficient to support propagation of transverse electric waves having one and two half-wave variations in intensity along the long cross-sectional dimension of said guide, a tapered rectangular guide for joining said single guide to said double guide, a T joint including a wave guide extending from either broad side of said double rectangular guide and capable of supporting propagation of transverse electric waves having two half-wave variations in the long cross-sectional dimension of said double guide, a second T joint including a wave guide extending from the short dimension of said double guide and adapted to support propagation of out-of-phase transverse electric waves from said double guide to thereby separate transverse electric waves having two half-wave variations along the long dimension of said double guide, and out-of-phase transverse electric waves having a single half-wave variation along the long cross-sectional dimension of said double guide from in-phase transverse electric waves having a single half-wave variation along the long dimension of said double guide.

6. Microwave transmission apparatus comprising two rectangular wave guides placed in juxtaposition with their long cross-sectional dimensions together, radiator means connected to the end of said guides for transmitting microwave energy from said wave guides to a distant target and receiving echoes of microwave energy back from said target, bridge means connected to said guides adjacent said radiator means for detecting a secondary mode of microwave energy transmission in said wave guides, and bridge means connected to said guides for detecting phase differences between the energies in each of said wave guides in the fundamental mode whereby the magnitude of output of said bridges is proportional to the angular deviations of said target from the axis of symmetry of said radiator means.

7. Microwave apparatus for transmitting and receiving transverse electric electromagnetic waves comprising two rectangular wave guides wide enough to accommodate transverse electric waves in said guide having two half-wave field intensity variations across the width of said guide placed in parallel with their wide dimensions touching, reflector means having its focus near the end of said guides for gathering reflected electromagnetic waves from a target in free space and exciting transverse electric waves in said wave guides, means connected to said guides near said reflector for detecting in said guides the amplitude of transverse electric waves having two half-wave intensity variations along the long cross-sectional dimension of said guides, and means connected to said guides for detecting the magnitude of difference in phase of the transverse electric waves having a single half wave length intensity variation along the long cross-sectional dimension in each of said guides whereby said amplitude and said difference are proportional to the angular displacement of said target from the axis of said guides extended for small angles.

8. Microwave transmission apparatus comprising a microwave reflector, a rectangular wave guide adapted to propagate microwave energy consisting of transverse electric waves having one and two half-wave variations in intensity along the long cross-sectional dimensions thereof, a septum inserted in said wave guide parallel to the long dimension thereof and splitting said guide evenly, a rectangular orifice cut in the short dimensioned side of said guide at the end of said septum to couple out of said guides transverse electric waves mutually out-of-phase in the two halves thereof, rectangular orifices in the center of the outside long cross-sectional dimensioned sides of said guide to couple out of said guide transverse electric waves having two half-wave intensity variations across the long dimension thereof, and impedance matching means connected to the end of said guide for illuminating said reflector and for matching the impedance of free space whereby the amplitude of transverse electric waves having two half-wave intensity variations along the long cross-sectional dimension of said guides is a function of the angular displacement of the reflective source thereof in the plane of said septum, and the amplitude of said tranverse electric waves mutually out-of-phase in said guides is a function of the angular displacement of the reflective source thereof in a plane normal to the plane of said septum.

9. Microwave transmission apparatus comprising a rectangular wave guide, a septum splitting a part of said guide into two rectangular wave guides, means connected to said two guides for coupling out of said guide all transverse electric waves having two half-wave intensity variations across the wide dimension thereof and means connected to said rectangular guide at the end of said septum for coupling out of said guide all mutually out-of-phase transverse electric waves in the separated portion of said guide whereby electromagnetic waves incident upon the end of said guide cause transverse electric waves having two half-wave intensity variations across the wide dimension of said guide to be transmitted therein if said waves originate from a source displaced in the plane of said septum from the axis of symmetry of said guide and cause transverse electric waves having components mutually out-of-phase to be transmitted therein if said waves originate from a source displaced from the plane of said septum.

References Cited in the file of this patent

UNITED STATES PATENTS

| | | |
|---|---|---|
| 2,436,408 | Tawney | Feb. 24, 1948 |
| 2,456,666 | Agate | Dec. 21, 1948 |
| 2,540,839 | Southworth | Feb. 6, 1951 |
| 2,567,197 | Fox | Sept. 11, 1951 |

OTHER REFERENCES

Article: "The Duo-Mode Exciter," by Hughes and Astrahan, published in Proceeding of IRE, vol. 37, No. 9, September 1949, page 1031.

Publication: "Microwave Transmission Circuits," by Ragan, vol. 9, of Radiation Laboratory Series, published by McGraw-Hill in 1948, page 523.